United States Patent
Blinder et al.

(10) Patent No.: US 11,928,605 B2
(45) Date of Patent: Mar. 12, 2024

(54) TECHNIQUES FOR CYBER-ATTACK EVENT LOG FABRICATION

(71) Applicant: International Business Machines Corporation, Armonk, NY (US)

(72) Inventors: Oleg Blinder, Haifa (IL); Nitzan Peleg, Haifa (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 16/532,519

(22) Filed: Aug. 6, 2019

(65) Prior Publication Data

US 2021/0042631 A1 Feb. 11, 2021

(51) Int. Cl.
*G06N 5/022* (2023.01)
*G06N 5/01* (2023.01)

(52) U.S. Cl.
CPC .............. *G06N 5/022* (2013.01); *G06N 5/01* (2023.01)

(58) Field of Classification Search
CPC ... H04L 43/04; H04L 63/1425; G06F 21/552; G06F 11/30; G06F 16/285; G06F 2201/86; G06F 21/554; G06N 20/00; G06N 5/025; G06N 3/0454; G06N 5/022; G06N 5/04; G06N 5/003; G06N 3/0445; G06K 9/00067; G06K 9/6262
See application file for complete search history.

(56) References Cited

U.S. PATENT DOCUMENTS

| | | | |
|---|---|---|---|
| 10,009,358 B1* | 6/2018 | Xie | G06F 21/552 |
| 2013/0227689 A1* | 8/2013 | Pietrowicz | G01R 1/20 726/23 |
| 2014/0165203 A1* | 6/2014 | Friedrichs | G06F 21/552 726/24 |
| 2016/0352759 A1* | 12/2016 | Zhai | H04L 63/1416 |
| 2017/0006055 A1 | 1/2017 | Strom et al. | |
| 2017/0251002 A1* | 8/2017 | Rostamabadi | G06F 21/566 |
| 2018/0034780 A1* | 2/2018 | Bray | G06F 21/577 |
| 2018/0232518 A1* | 8/2018 | Copty | G06F 21/566 |
| 2018/0357422 A1 | 12/2018 | Telang et al. | |
| 2021/0014263 A1* | 1/2021 | Soroush | G06N 5/022 |

FOREIGN PATENT DOCUMENTS

| | | |
|---|---|---|
| CN | 109194693 A | 1/2019 |
| WO | 2018216000 A1 | 11/2018 |

OTHER PUBLICATIONS

He et al. Experience Report: System Log Analysis for Anomaly Detection (2016) (Year: 2016).*

(Continued)

*Primary Examiner* — Luis A Sitiriche
(74) *Attorney, Agent, or Firm* — Kelli D. Morin

(57) ABSTRACT

Systems for generating attack event logs are disclosed. An example system includes a storage device for storing an event log template. The system also includes a processor to receive a selection of the event log template, and receive an attack description comprising user instructions to fabricate synthetic log entries according to a format defined in the event log template. The attack description includes variables and rules for determining values for the variables. The processor generates the attack event log by determining values that satisfy the rules and writing the values into selected fields of the event log template.

20 Claims, 7 Drawing Sheets

(56) References Cited

OTHER PUBLICATIONS

Xu et al., "Sequence Generative Adversarial Network for Long Text Summarization," 2018 IEEE 30th International Conference on Tools with Artificial Intelligence (ICTAI), 2018, pp. 242-248, doi: 10.1109/ICTAI.2018.00045. (2018) (Year: 2018).*
Hendry et al. Intrusion signature creation via clustering anomalies (Mar. 17, 2008) (Year: 2008).*
Landauer et al., Dynamic log file analysis: An unsupervised cluster evolution approach for anomaly detection (2018) (Year: 2018).*
Anomalous Network Packet Detection Using Data Stream Mining Zachary Miller, William Deitrick, Wei Hu (Year: 2011).*

* cited by examiner

400

TECHNIQUES FOR CYBER-ATTACK EVENT LOG FABRICATION

BACKGROUND

The present disclosure relates to techniques for fabricating a cyber-attack event log.

SUMMARY

According to an embodiment described herein, a system for generating attack event logs includes a storage device for storing an event log template. The system also includes a processor to receive a selection of the event log template, and receive an attack description that includes user instructions to fabricate synthetic log entries according to a format defined in the event log template. The attack description includes variables and rules for determining values for the variables. The processor generates the attack event log by determining values that satisfy the rules and writing the values into selected fields of the event log template.

In some embodiments, a method of generating an attack event log includes receiving a selection of an event log template, and receiving an attack description that includes user instructions to fabricate synthetic log entries according to a format defined in the event log template. The attack description includes variables and rules for determining values for the variables. The method also includes generating the attack event log by determining values that satisfy the rules and writing the values into selected fields of the event log template.

In yet another embodiment, a computer program product for generating an attack event log can include a computer readable storage medium having program instructions embodied therewith, wherein the computer readable storage medium is not a transitory signal per se. The program instructions can be executable by a processor to cause the processor to receive a selection of the event log template, and receive an attack description that includes user instructions to fabricate synthetic log entries according to a format defined in the event log template. The attack description includes variables and rules for determining values for the variables. Additionally, the program instructions can be executable to cause the processor to generate the attack event log by determining values that satisfy the rules and writing the values into selected fields of the event log template.

DETAILED DESCRIPTION

Security Information and Event Management (SIEM) systems detect cyber threats by analyzing event log entries from different systems, security products, and applications. Cyber range systems are used to train organization security teams to use a SIEM system to defend the organization against cyber-attacks. To enable the training, cyber range solutions inject event-log entries of cyber-attacks into benign system event-logs. Event logs with cyber-attacks can also be used to test and demonstrate the SIEM systems.

Generating a cyber-attack event log is a labor intensive process that requires manual entry of multiple events that are indicative of an attack and maintain data consistency throughout the attack scenario. For example, in some cases, a designer of an cyber-attack event log may start with a benign event log and manually replace selected entries with new fictitious entries that are consistent with an attack. One drawback of this approach is that the user must specify the values in each new event log entry while ensuring that the values are consistent with the attack scenario.

The present disclosure describes techniques for automatically generating an event log representing a cyber-attack scenario. The system can receive a collection of event log entry templates representing different log formats and entry types but the data in the log entries doesn't represent a consistent attack scenario. The system parses the entries and variables, and allows the user to specify rules to describe the appropriate values in different locations in the event log entries. The symbolic representation of the problem and the rules help the user to maintain consistency in the generated attack scenario. Once the variables and rules for the specific attack scenario are specified, a log fabrication engine generates the attack event log, which represents an attack scenario. The system described herein enables the creation of an attack event log that is consistent with regard to the specific data included in the event log.

Figure 1:
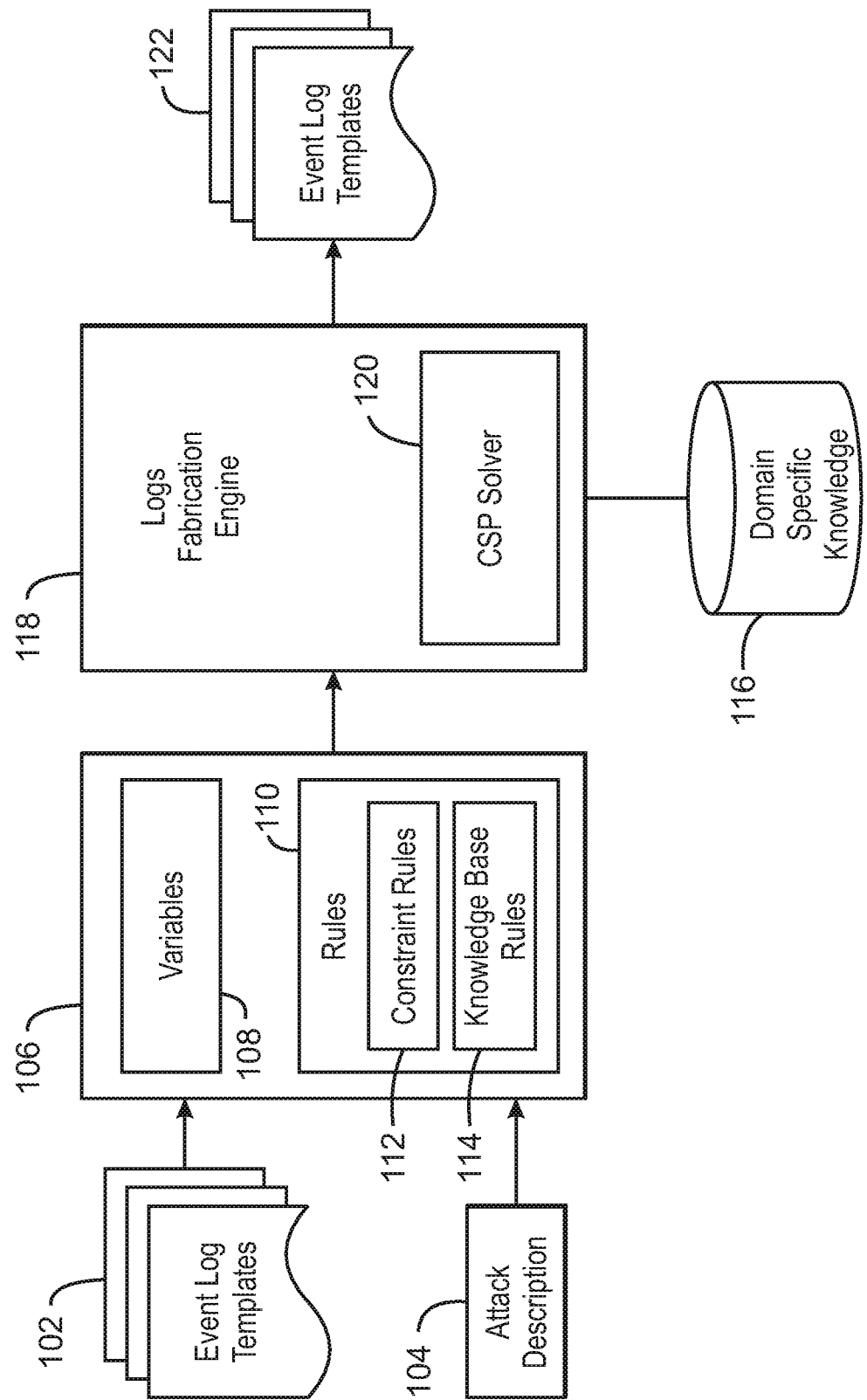
FIG. 1 depicts a block diagram of an example computing system for generating an attack event log according to an embodiment described herein.

FIG. 1 is a block diagram of an example system for generating an attack event log. The input to the system 100 includes one or more event log templates 102 and an attack description 104. The event log template 102 includes several log entries that together represent an event log pattern of events related to a specific system, application, or security product. The event log template 102 may be an actual event log previously generated by the specific system, application, or security product. The event log template 102 may include event log events that were captured during an actual attack. The same event log entry type may repeat more than once in the event log template. The event log may include various data fields such as an event type, event time stamps, and information associated with each event such as user name, network or computer Internet Protocol (IP) address, computer name, email address of a sender or recipient, site of attachment, hash value of malware, MAC addresses, and more.

The attack description 104 is received from the user and results in a set of user directives 106 for replacing fields of the event log template 102 with new values. The attack description 104 may be received from the user who selects fields of the event log template 102 to be replaced with programming variables 108. In some embodiments, the system 100 parses the event log template 102 to identify the unique data field values in the event log template 102. The system 100 may then enable the user to choose which data fields values to replace with variables. For example, the user may choose to replace an IP address with a variable named "AttackerIP". For each variable, the user may specify a variable name, a variable datatype, and a variable format that determines the format of the data to be entered in to the attack event log pursuant to the variable. The variables may be organized as single variables, tuples, or in a hierarchical representation.

The user may also specify a set of rules 110 that are used to determine values for each of the variables 108. The rules 110 may include constraint rules 112, knowledge base rules 114, and other types of rules. The constraint rules 112 may be used to determine an acceptable range for each of the variables. Some of the constrain rules 112 may also be specified to determine a proper relationship between variables, such as a proper temporal order of the event log entries. For example, for a set of time stamp variables, the constraint rules may specify that a time stamp associated with a specific event log entry must be greater than a time stamp associated with another specific event log entry.

The knowledge base rules 114 enable variable values to be determined from a set of domain specific knowledge 116. The domain specific knowledge 116 may be obtained, for example, from a database or one or more files. The domain specific knowledge 116 can include expert knowledge related to known attack scenarios. For example, the domain specific knowledge 116 may include a listing of malware signatures, and identifying information regarding known malicious actors, such as IP addresses. In the case of a malicious email associated with phishing attack, for example, the domain specific knowledge 116 may include email addresses of known malicious senders, subject line text, and the text of the body of the email, among others. The knowledge base rules 114 may specify sub-tuples of possible values based on tuples in a domain specific knowledge base that meet specific conditions. For example, the knowledge based rule 114 may specify the selection of a senders email address from list of known malicious senders. The selection of the senders email address may also determine the other values of a tuple, such as a subject line text associated with the senders email address. In this way, the selection of the variable values will be consistent for known attack scenarios.

After receiving the attack description from the user, the set of user directives 106 may be used to fabricate synthetic log entries according to the format defined in Event Log Templates 102, following the attack scenario description 104, and satisfying the user directives 106. In some embodiments, the user directives 106 may be input to a log fabrication engine 118. The log fabrication engine 118 creates a constraint satisfaction problem (CSP) and submits the CSP to a constraint satisfaction problem (CSP) solver 120. The CSP solver 120 solves the CSP, producing variable values that obey all of the user directives 106. The values selected by the CSP solver 120 may be pseudo-random values that satisfy the specified data type and all of the applicable rules 110, including the constraint rules 112 and the knowledge base rules 114. The log fabrication engine 118 can also access the database of domain specific knowledge 116 to obtain values as indicated by the knowledge base rules 114.

The selected variable values are use to generate the attack event log entries, which will be formatted according the specified data format associated with the variable. Each of the event log entries are stored to the attack event log 122. The attack event log 122 can be read by a SEIM system or used to generate a stream of events that can be input to a SEIM system. The event log entries may also be integrated with benign event log files.

Figure 2A:
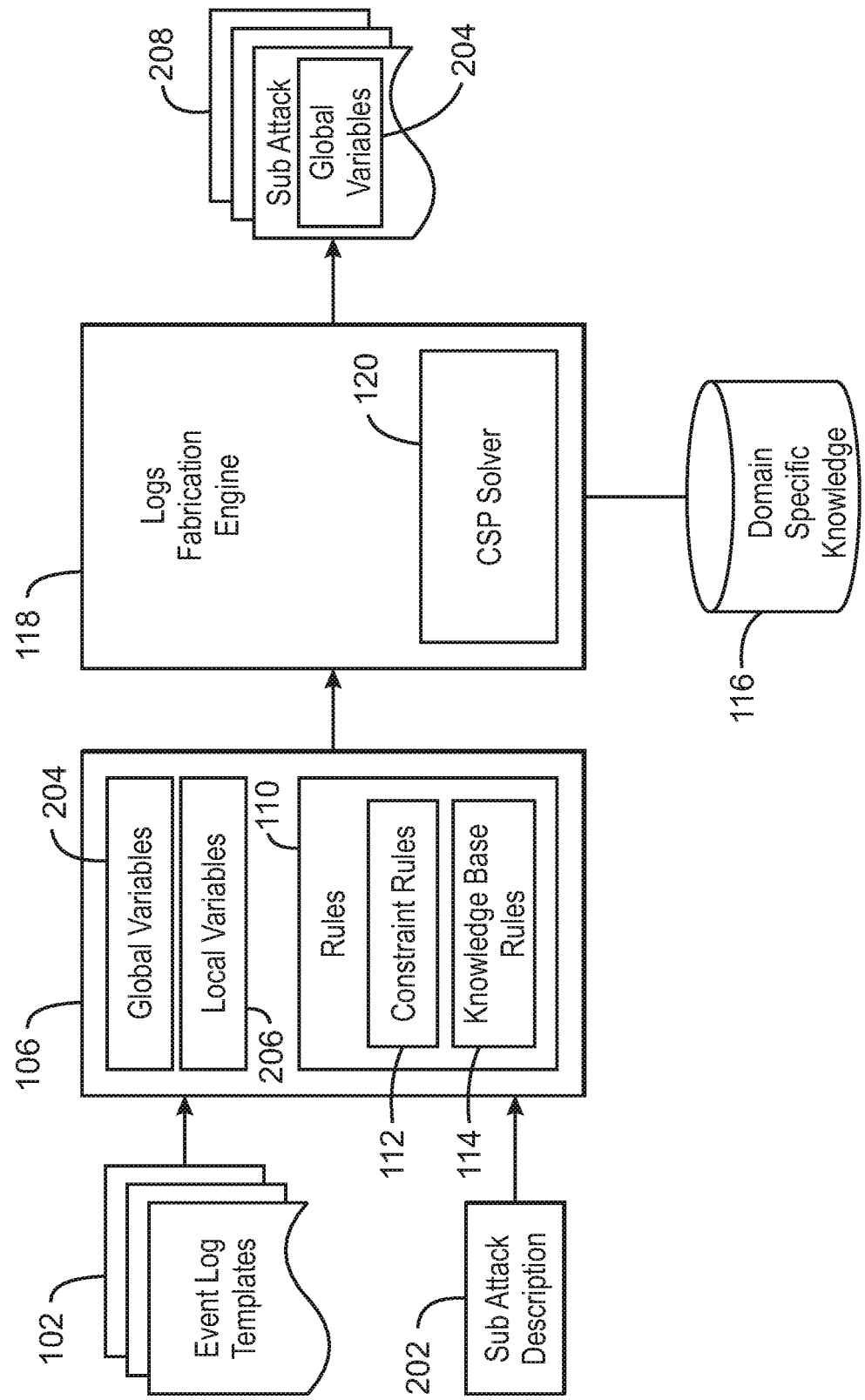
FIGS. 2A and 2B are block diagrams of another example system for generating an attack event log, according to an embodiment described herein.
Figure 2B:
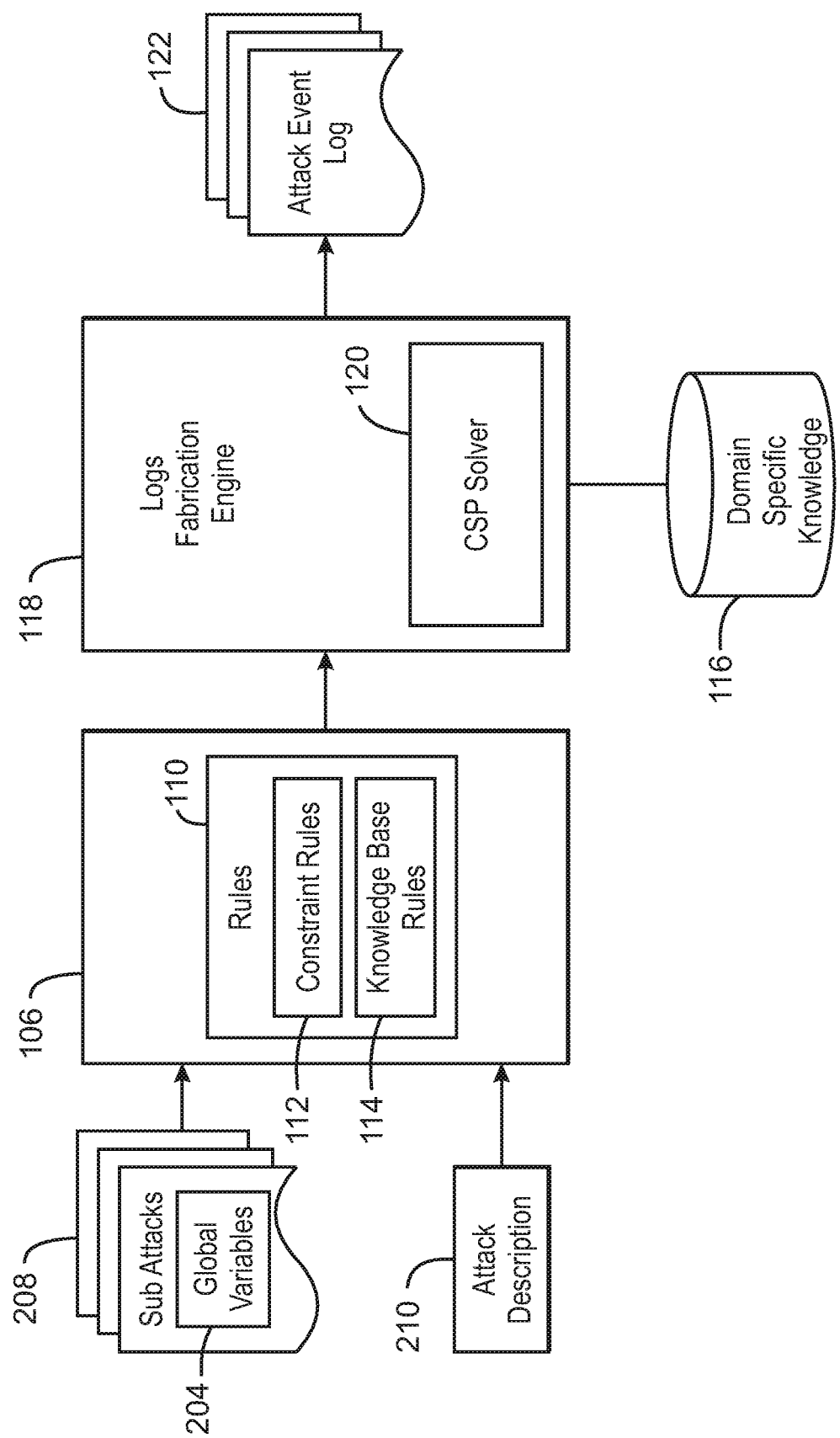

FIGS. 2A and 2B are block diagrams of another example system for generating an attack event log. In the embodiments described in relation to FIGS. 2A and 2B, the system is used to generate an attack log in two stages. In the first stage, described in relation to FIG. 2A, event logs are generated for a number of sub attacks. In the second stage, described in relation to FIG. 2B, the sub attacks are combined to generate an attack event log with multiple types of attacks.

In a realistic attack scenario, an attacker may initiate a variety of different types of attacks at different times depending, for example, on the success or failure of different stages of the attack. For example, an early type of attack perpetrated by an attacker may be a series of attempts to pass a firewall. After successfully passing the firewall, the attacker may move on to a different stage of the attack, such as attempting to access a restricted server or computer. Accordingly, generating a realistic attack event log may include recreating a variety of different types of attacks and combining the resulting log entries in a way that is consistent across the attack scenario. For example, it may be helpful in some scenarios to show that the attacker IP is the same for each type of attack. The system 200 is similar to the system 100 of FIG. 1 and enables the user to generate an attack event log for a sub attack, and then generate a more complex attack using two or more sub attacks.

The input to the system 200 includes one or more event log templates 102 and a sub attack description 202. As with the attack description 104 described in relation to FIG. 1, the sub attack description 202 is received from the user and results in a set of user directives 106 for replacing fields of the event log template 102 with new values. The system 100 can parse the event log template 102 and enable the user to choose data fields values to replace with variables, which include global variables 204 and local (i.e., temporary) variables 206. The user may specify, for each variable, whether the variable is global or local. The sub attack description 202 may relate to any type of attack scenario, such as a phishing attack, dictionary attack, lateral movement, command-and-control (C&C) trojan attack, and others.

The user may also specify a set of rules 110 that are used to determine values for each of the local variables 206. In some embodiments, the rules 110 include the constraint rules 112 and the knowledge base rules 114. As explained above, the knowledge base rules 114 enable variable values to be determined from a database or file of domain specific knowledge 116, which includes expert knowledge related to known attack scenarios. The global variables 204 remain as variables until the next stage of the process described in FIG. 2B.

The user directives 106 may be input to a log fabrication engine 118. The log fabrication engine 118 includes the CSP solver 120 that generates a value for the local variables 206 based on values that solve the constraint rules 112. The log fabrication engine 118 can also access the domain specific knowledge 116 to obtain values as indicated by the knowledge base rules 114.

The selected variable values are used to generate the event log entries for a sub attack description 208, which will be formatted according the specified data format associated with the variable. Each of the event log entries are stored to the sub attack description 208. Some of the data fields in the event log entries will be populated by the global variables 204. The system shown in FIG. 2A may be used to generate several different types sub attack descriptions 208, which may be stored to a repository and retrieved for later use as described in relation to FIG. 2B.

FIG. 2B is a block diagram showing the process for generating an attack event log using the sub attack descriptions 204. The input to the system 200 includes one or more sub attack descriptions 208 and an attack description 210. Each sub attack description 208 includes several log entries that together represent an event log pattern of a specific attack. Some of the data fields of the sub attack description will have been replaced by global variables 204 as described in relation to FIG. 2A.

The attack description 210 is received from the user and results in a set of user directives 106 for determining the values of the global variables 204. In some embodiments, the system 100 parses the sub attack descriptions 208 to identify the global variables 204. The system 100 may then enable the user to specify rules 110 for determining the values for the global variables 204. The rules can include constraint rules, which specify the relationships between the global variables 204. For example, the user may specify an equality between variables, in other words, specifying that a variable in one sub attack be set equal to another variable in another sub attack. The user may also specify a temporal ordering of events by specifying a relative relationship between timestamp variables. In some embodiments, the rules 110 may include knowledge base rules 114 that enable variable values to be determined from a database of domain specific knowledge 116.

After receiving the attack description 210 from the user, the set of user directives 106 may be used to fabricate synthetic log entries according to the format defined in the sub attack descriptions 208 following the attack scenario description 210, and satisfying the user directives 106. In some embodiments, the user directives 106 may be input to the log fabrication engine 118, which creates a CSP and submits the CSP to a CSP solver 120. The CSP solver 120 solves the CSP, producing variable values that obey all of the user directives 106. The log fabrication engine 118 can also access the database of domain specific knowledge 116 to obtain values as indicated by the knowledge base rules 114.

The selected variable values are used to generate the attack event log entries, which will be formatted according the specified data format associated with the variable. Each of the event log entries are stored to the attack event log 122. The attack event log 122 can be read by a SEIM system or used to generate a stream of events that can be input to a SEIM system. The event log entries may also be integrated with benign event log files.

Figure 3:
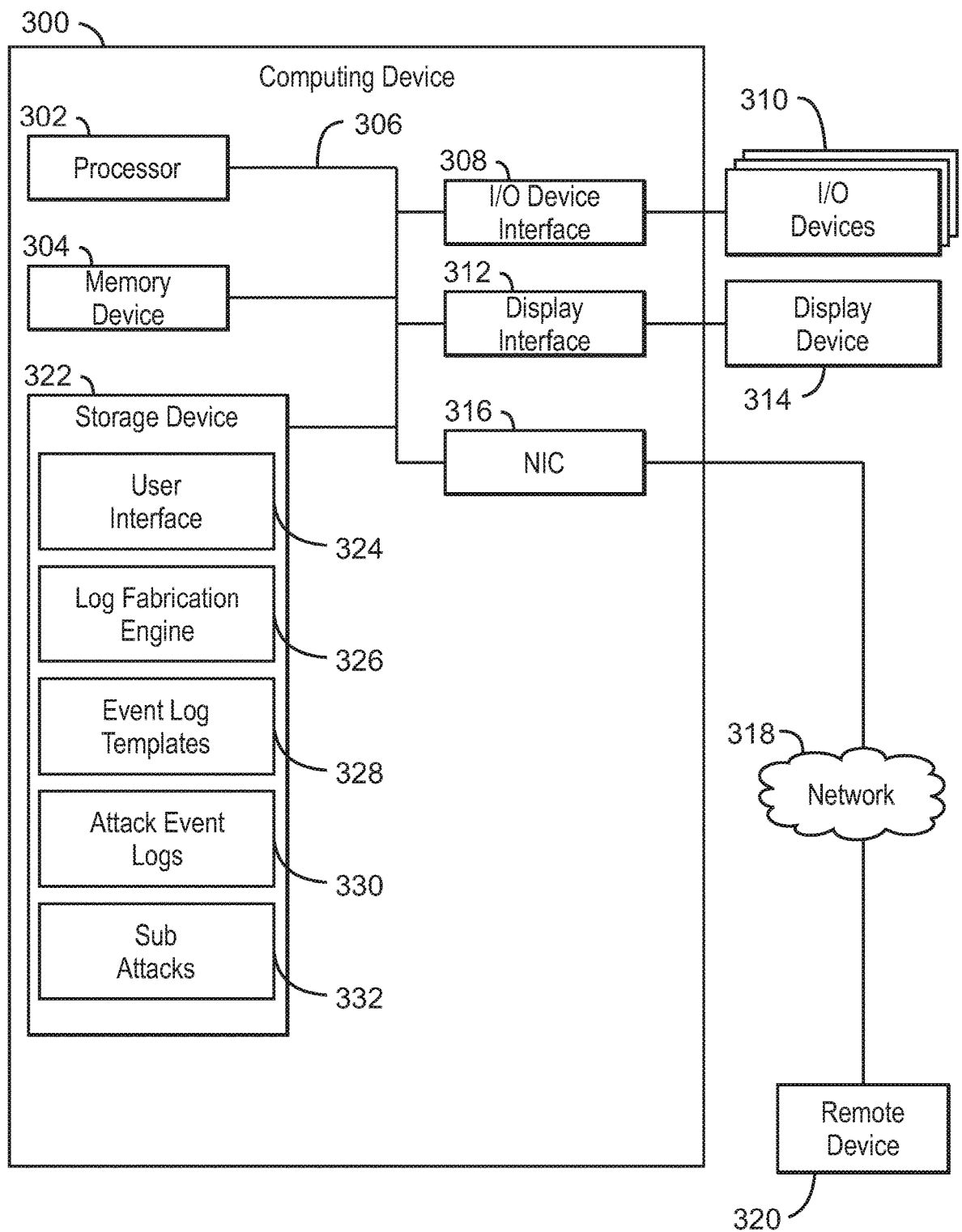
FIG. 3 is a block diagram of example computing device configured to generate an attack event log.

FIG. 3 is a block diagram of example computing device configured to generate an attack event log. The computing device 300 may be for example, a server, desktop computer, laptop computer, and others. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is adapted to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. A remote device 320 may connect to the computing device 300 through the network 318.

In some examples, the processor 302 can be linked through the system interconnect 306 to the storage device 322, which can include a user interface 324 and log fabrication engine 326. The user interface 324 enables the user to generate the user directives 106 described in relation to FIGS. 1, 2A, and 2B. In some embodiments, the user interface 324 parses an event log template 328 selected by the user and enables the user to replace the values of selected data fields with variables, which include a variable name, type, and output format as described above. The user interface also enables the user to specify the variable constraint rules, including the acceptable range for the variables, the relationships between the variables, and the knowledge base rules. The log fabrication engine 326 generates the event log entries based on the selected event log template 328 as well as the variables and the constraint rules specified by the user. The event log entries may be stored as a complete attack event log 330 or as a sub attack description 332.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the user interface 324 and log fabrication engine 326 are partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities are implemented with logic, wherein the logic, as referred to herein, can include any suitable hardware (e.g., a processor, among others), software (e.g., an application, among others), firmware, or any suitable combination of hardware, software, and firmware.

Figure 4:
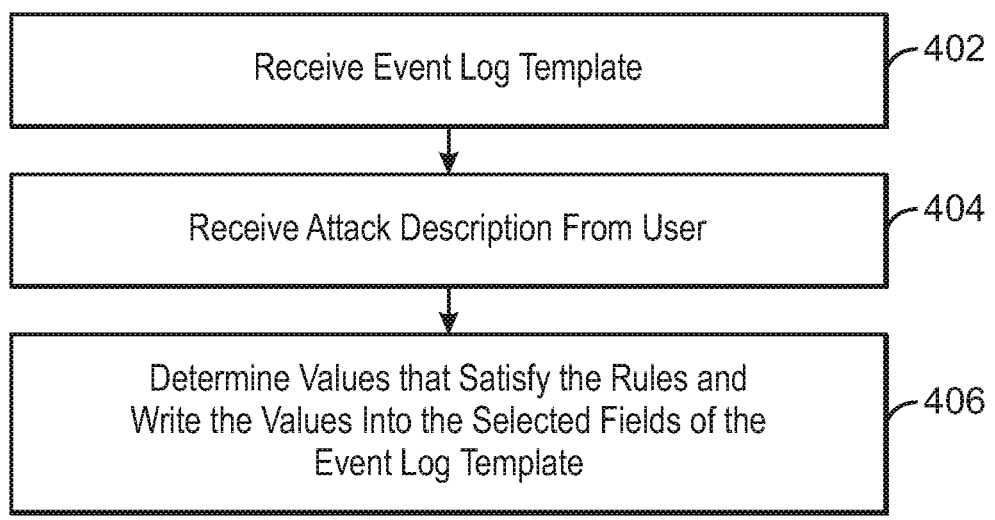
FIG. 4 is a process flow diagram summarizing an example method of generating an attack event log.

FIG. 4 is a process flow diagram summarizing an example method of generating an attack event log. The method 400 can be implemented with any suitable computing device, such as the computing device 300 of FIG. 3, and may begin at block 402.

At block 402, an event log template is received. For example, the user may select the event log template from a database of previously stored templates. The event log templates may be actual event logs previously generated by a specific system, application, or security product.

At block 404, an attack description is received from the user. The attack description includes user instructions to replace selected fields of the event log template with variables. For each variable, the user may specify a variable name, a data type, and an output format. The attack description also includes the constraint rules for determining values for the variables. For example, the constraint rules may be rules that describe a valid value for each variable and a relationship between the variables. In some embodiments, the constraint rules include knowledge base rules, i.e., rules for determining how to obtain values from a database of known attack scenarios.

At block 406, the attack event log is generated by determining values that satisfy the constraint rules and writing the values into the selected fields of the event log template. At least some of the values may be pseudo-random values generated using a constraint satisfaction problem (CSP) solver. In some cases, some of the values may be obtained from a database of known attack scenarios in accordance with the knowledge base rules. The attack event log may be stored for later retrieval by a SIEM system or may be streamed to a SIEM system.

In some embodiments, as described further in relation to FIGS. 2A and 2B, the attack description describes a sub-attack, and the attack event log is stored to a sub attack description. In this embodiment, the attack description may identify each of the variables as local variables or global variables. The local variables are replaced by the values determined at block 406, whereas the global variables are stored in the sub attack description. The generation of the attack event log may completed by receiving a number of sub attack descriptions, receiving additional constrain rules for the global variables, and determining values for the global variables that satisfy the additional constraint rules.

The process flow diagram of FIG. 4 is not intended to indicate that the operations of the method 200 are to be executed in any particular order, or that all of the operations of the method 200 are to be included in every case. Additionally, the method 400 can include additional operations. Addition variations on the above method 400 may be made within the scope of the described subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
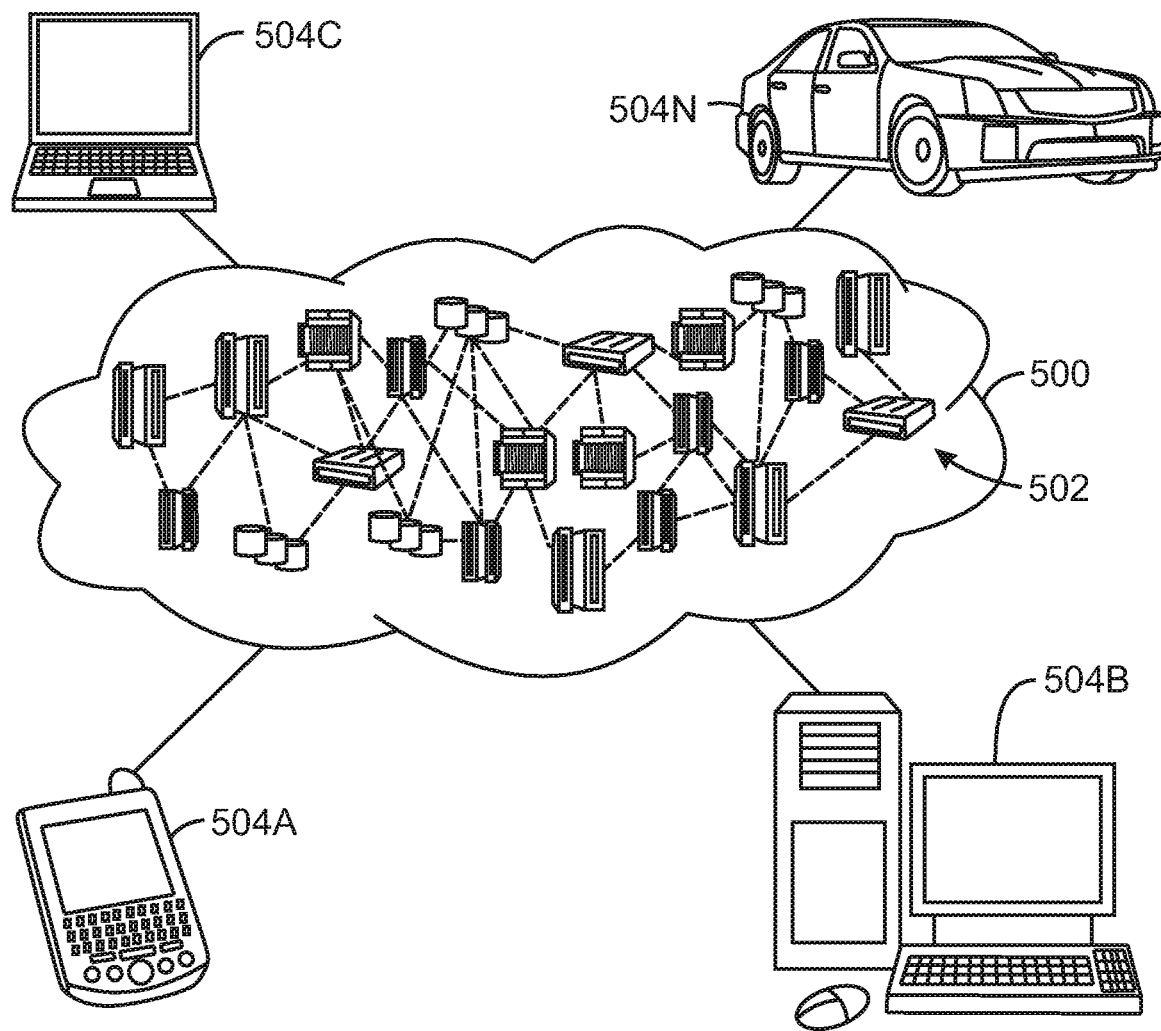
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
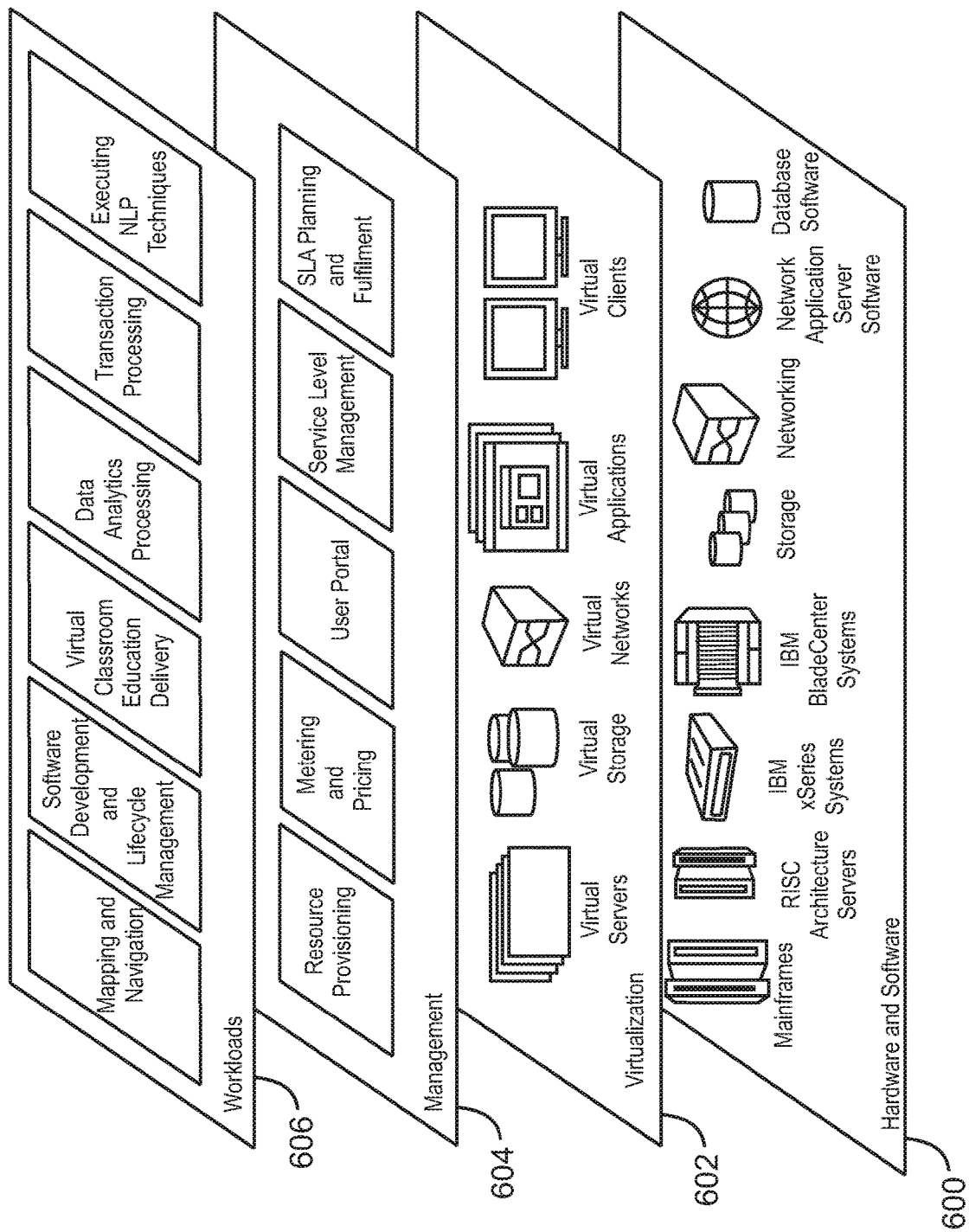
FIG. 6 depicts a set of functional abstraction layers provided by a cloud computing environment according to an embodiment described herein.

Referring now to FIG. 6, a set of functional abstraction layers provided by cloud computing environment 600 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generation of event logs representing attack scenarios.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating an attack event log comprising:
a storage device for storing an event log template;
a processor to:
receive a selection of event log templates representing different log sources and entry types, wherein log entries in the event log templates do not represent a consistent attack scenario;
receive an attack description comprising user instructions to fabricate synthetic log entries according to a format defined in the event log templates, the attack description comprising variables and rules for determining values for the variables;
automatically generate the attack event log representing an attack scenario and comprising a synthetic log entry that is fabricated by determining a value that satisfies the rules and writing the value into selected fields of the event log templates and combining the resulting log entries representing a plurality of different types of sub attacks using a temporal ordering of events in a manner that is consistent across the attack scenario;
integrate a benign event log file that excludes attacks with the automatically generated attack event log to generate a stream of events that is consistent based on the automatically generated attack event log; and
send the generated stream of events to a Security Information and Event Management (SIEM) system, wherein the generated stream of events is used to test the SIEM.

2. The system of claim 1, wherein each of the variables comprises a variable name, a data type, and an output format.

3. The system of claim 1, wherein the rules comprise constraint rules that describe a relationship between global variables in the different types of sub attacks and valid ranges for the global variables.

4. The system of claim 1, wherein to determine values that satisfy the rules comprises to obtain at least some of the values from a set of knowledge of known attack scenarios in accordance with the rules, wherein the rules comprise knowledge base rules.

5. The system of claim 1, wherein to determine the values comprises to generate pseudo-random values using a constraint satisfaction problem (CSP) solver.

6. The system of claim 1, wherein the attack description describes a sub-attack, and wherein the attack event log is stored to a sub attack description.

7. The system of claim 6, wherein the attack description identifies each of the variables as local variables or global variables, wherein the local variables are replaced by the determined values and the global variables are stored in the sub attack description.

8. The system of claim 7, wherein to generate the attack event log comprises to receive the sub attack description and one or more additional sub attack descriptions, and receive additional rules for the global variables.

9. The system of claim 1, wherein the event log template is an actual event log previously generated by a specific system, application, or security product.

10. The system of claim 1, wherein the rules comprise a constraint rule that specifies the temporal ordering of events by specifying a relative relationship between timestamp variables.

11. A method of generating an attack event log, the method comprising:
receiving a selection of event log templates representing different log sources and entry types, wherein log entries in the event log templates do not represent a consistent attack scenario;
receiving an attack description comprising user instructions to fabricate synthetic log entries according to a format defined in the event log template, the attack description comprising variables and rules for determining values for the variables;
automatically generating the attack event log representing an attack scenario and comprising a synthetic log entry that is fabricated by determining values that satisfy the rules and writing the values into selected fields of the event log templates and combining the resulting log entries representing a plurality of different types of sub attacks using a temporal ordering of events in a manner that is consistent across the attack scenario;
generating a stream of events that is consistent based on the automatically generated attack event log by integrating a benign event log file that excludes attacks with the automatically generated attack event log; and
sending the generated stream of events to a Security Information and Event Management (SIEM) system, wherein the generated stream of events is used to test the SIEM.

12. The method of claim 11, wherein each of the variables comprises a variable name, a data type, and an output format.

13. The method of claim 11, wherein the rules comprise knowledge base rules.

14. The method of claim 13, wherein determining the values that satisfy the rules comprises obtaining at least some of the values from a set of knowledge of known attack scenarios in accordance with the knowledge base rules.

15. The method of claim 11, wherein determining the values comprises to generate pseudo-random values using a constraint satisfaction problem (CSP) solver.

16. The method of claim 11, wherein the attack description describes a sub-attack, and wherein the attack event log is stored to a sub attack description.

17. The method of claim 16, wherein the attack description identifies each of the variables as local variables or global variables, wherein the local variables are replaced by the determined values and the global variables are stored in the sub attack description.

18. The method of claim 17, wherein generating the attack event log comprises receiving the sub attack description and one or more additional sub attack descriptions, and receiving additional rules for the global variables.

19. The method of claim 11, wherein the event log template is an actual event log previously generated by a specific system, application, or security product.

20. A computer program product for generating an attack event log comprising a computer readable storage medium having program instructions embodied therewith, and wherein the program instructions are executable by a processor to cause the processor to:
receive a selection of event log templates representing different log sources and entry types, wherein log entries in the event log templates do not represent a consistent attack scenario;
receive an attack description comprising user instructions to fabricate synthetic log entries according to a format defined in the event log template, the attack description comprising variables and rules for determining values for the variables;

automatically generate the attack event log representing an attack scenario and comprising a synthetic log entry that is fabricated by determining values that satisfy the rules and writing the values into the selected fields of the event log templates and combining the resulting log entries representing a plurality of different types of sub attacks using a temporal ordering of events in a manner that is consistent across the attack scenario;

generate a stream of events that is consistent based the automatically generated attack event log by integrating a benign event log file that excludes attacks with the automatically generated attack event log; and send the generated stream of events to a Security Information and Event Management (SIEM) system, wherein the generated stream of events is used to test the SIEM.

\* \* \* \* \*